(No Model.)
R. GRACEY.
AXLE.
No. 365,178. Patented June 21, 1887.
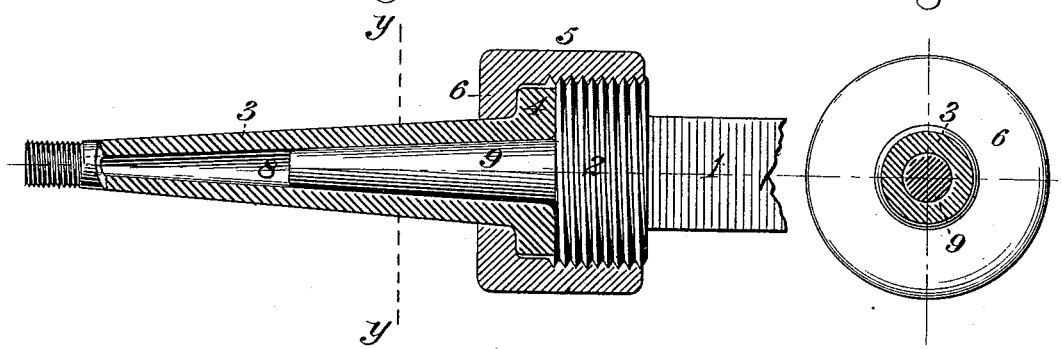
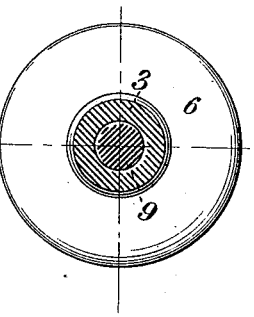
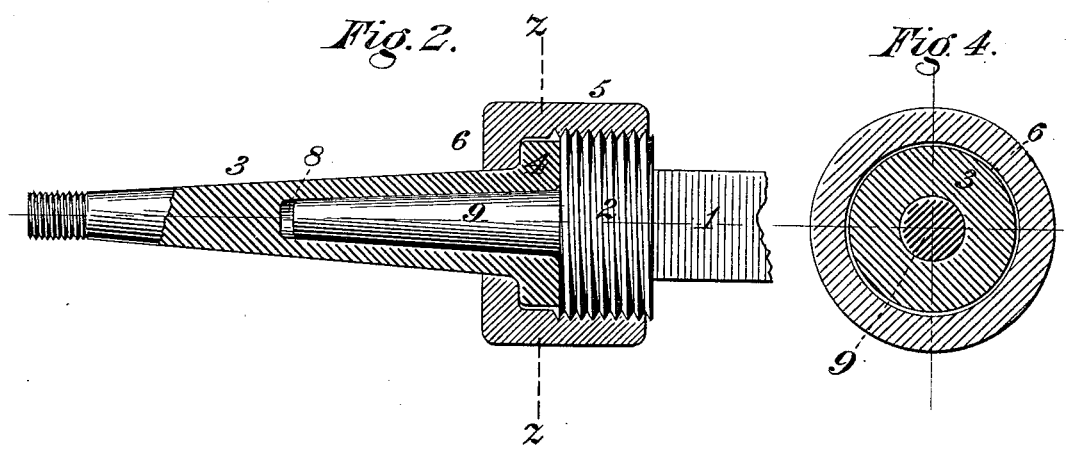
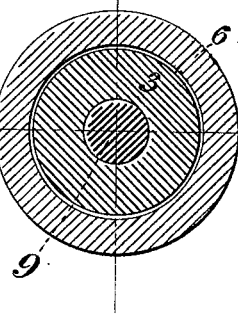
WITNESSES:
INVENTOR,
Robert Gracey
By Darwin S. Wolcott
Att'y.

UNITED STATES PATENT OFFICE.

ROBERT GRACEY, OF ALLEGHENY, PENNSYLVANIA.

AXLE.

SPECIFICATION forming part of Letters Patent No. 365,178, dated June 21, 1887.

Application filed January 22, 1887. Serial No. 225,137. (No model.)

*To all whom it may concern:*

Be it known that I, ROBERT GRACEY, residing at Allegheny, in the county of Allegheny and State of Pennsylvania, a citizen of the United States, have invented or discovered certain new and useful Improvements in Axles, of which improvements the following is a specification.

In the accompanying drawings, which make part of this specification, Figure 1 is a view, partly in elevation and partly in section, of an axle embodying my invention. Fig. 2 is a similar view of a different form of embodiment of the invention. Figs. 3 and 4 are transverse sectional views taken on the lines *y y* and *z z*, Figs. 1, 2, respectively.

It has heretofore been generally customary in manufacturing wagon-axles to form the spindle or wheel bearings integral with the axle, thereby rendering it necessary in case of injury to the spindle, either by wear or otherwise, to remove the entire axle from the wagon or other vehicle for repair or renewal of the spindle.

The object of the invention herein is to form the spindle independent of the axle, and to so connect the axle and spindle that the latter may be rotarily adjusted or entirely removed, as circumstances may require; and to these ends the invention consists in the construction and combination of parts, substantially as hereinafter more fully described and claimed.

In the practice of my invention the axle 1 is formed at its ends with an externally-threaded shoulder or collar, 2, and the spindle or wheel bearings 3, of the usual shape and construction, are provided with a shoulder or collar, 4, at their inner or larger ends. The spindle and axle, constructed as above described, are placed together, as shown in the drawings, and a sleeve, 5, provided at one end with an inwardly-projecting flange, 6, for engagement with the shoulder 4 on the spindle, and internally threaded at the opposite end for engagement with the threaded collar 2 of the axle, is slipped over the spindle and screwed onto the threaded collar of the axle, thereby firmly clamping the spindle and axle together. The spindle 3 is made with an axial opening extending through or partially through the spindle, as shown, and the axle is provided with a horn or projection, 9, constructed to fit closely within the axial opening 8 in the spindle. Although the axial opening extending partially through the spindle may be suitable for some purposes, yet I prefer a construction wherein the axial opening extends entirely through the spindle, as the latter construction is more cheaply and easily made and permits of a longer, and consequently firmer, bearing of the spindle upon the horn or projection 9 of the axle.

It will be readily seen that by uniting the spindle and axle in the manner above described the spindle can be easily rotated by loosening the sleeve for the purpose of changing the bearing-surface, and can also be quickly removed entirely from the axle when necessary.

I am aware that spindles have heretofore been detachably connected to the axles of vehicles, and therefore make no claim to such construction, broadly.

I claim herein as my invention—

The combination of an axle exteriorly threaded at its end, and provided with a conical horn or projection, a spindle having an axial opening therein and constructed to fit upon the horn or projection, and provided with a collar or shoulder at its inner end, and an internally-threaded sleeve provided at one end with an inwardly-projecting flange, substantially as set forth.

In testimony whereof I have hereunto set my hand.

ROBERT GRACEY.

Witnesses:
DARWIN S. WOLCOTT,
R. H. WHITTLESEY.